US010175627B2

(12) United States Patent
Kawashima

(10) Patent No.: US 10,175,627 B2
(45) Date of Patent: Jan. 8, 2019

(54) SHEET CONVEYING DEVICE AND IMAGE FORMING APPARATUS INCLUDING THE SAME

(71) Applicant: KYOCERA Document Solutions Inc., Osaka (JP)

(72) Inventor: Tetsuro Kawashima, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 15/887,374

(22) Filed: Feb. 2, 2018

(65) Prior Publication Data
US 2018/0224793 A1 Aug. 9, 2018

(30) Foreign Application Priority Data

Feb. 6, 2017 (JP) .................................. 2017-019830

(51) Int. Cl.
| | |
|---|---|
| G03G 15/00 | (2006.01) |
| B41J 11/00 | (2006.01) |
| B65H 3/08 | (2006.01) |
| B65H 5/22 | (2006.01) |
| B65H 11/00 | (2006.01) |
| H02P 21/34 | (2016.01) |
| B41J 2/14 | (2006.01) |
| B41J 3/54 | (2006.01) |
| H04N 1/00 | (2006.01) |

(52) U.S. Cl.
CPC ....... *G03G 15/6573* (2013.01); *B41J 2/14451* (2013.01); *B41J 3/543* (2013.01); *B41J 11/0085* (2013.01); *B65H 3/08* (2013.01); *B65H 5/22* (2013.01); *B65H 11/005* (2013.01); *G03G 15/5054* (2013.01); *H02P 21/34* (2016.02); *H04N 1/00602* (2013.01); *B65H 2301/531* (2013.01); *H04N 2201/0094* (2013.01)

(58) Field of Classification Search
CPC ....... B41J 2/16579; B41J 2/01; B41J 11/0095
See application file for complete search history.

(56) References Cited

U.S. PATENT DOCUMENTS

2013/0135407 A1\* 5/2013 Abe .......................... B41J 15/16
347/102

FOREIGN PATENT DOCUMENTS

| JP | 2010-94870 | 4/2010 |
|---|---|---|
| JP | 2011-93639 | 5/2011 |

\* cited by examiner

*Primary Examiner* — Bradley Thies
(74) *Attorney, Agent, or Firm* — Wenderoth, Lind & Ponack, L.L.P.

(57) ABSTRACT

In a sheet conveying device, a foreign substance separating unit has an air discharge chamber, foreign substance collection chamber, air introduction chamber, a plurality of first air vents formed in a first partition wall that partitions the air introduction chamber and the foreign substance collection chamber, a plurality of second air vents formed in a second partition wall that partitions the air introduction chamber and the air discharge chamber, centrifugal separation parts each including a reverse truncated cone-like wall portion extending downward from each of the first air vents, cylindrical parts that each are provided coaxially with each of the centrifugal separation parts, and an inclination surface portion that is formed around each of the cylindrical parts above each of the first air vents and is inclined in a circumferential direction.

5 Claims, 11 Drawing Sheets

SHEET CONVEYING DEVICE AND IMAGE FORMING APPARATUS INCLUDING THE SAME

CROSS-REFERENCE TO RELATED APPLICATION

This application is based upon and claims the benefit of priority from Japanese Patent Application No. 2017-019830 filed on Feb. 6, 2017, the entire contents of which are incorporated herein by reference.

BACKGROUND

The technology of the present disclosure relates to a sheet conveying device and an image forming apparatus including the same.

In the related art, as a sheet conveying device of an inkjet printer and the like, there has been known a sheet conveying device that conveys a sheet by sucking and holding the sheet to/on an endless belt wound around a pair of tension rollers. The belt is formed with a plurality of air vents. At a radial inside of the belt, a negative pressure generating device is provided to apply negative pressure to the sheet via the plurality of air vents. At a radial outside of the belt, an ink head is provided to record an image by discharging ink to the sheet held on an outer peripheral surface of the belt.

The aforementioned negative pressure generating device has a fan case mounted with a fan. A top plate part of the fan case abuts an inner peripheral surface of the belt. The top plate part supports the sheet, which is held on the outer peripheral surface of the belt, from below via the belt. The top plate part is formed with a plurality of suction holes extending in a sheet conveyance direction. The suction holes allow the air vents of the belt to communicate with a negative pressure chamber of the fan case. In this way, negative pressure in the fan case applies to the sheet held on the outer peripheral surface of the belt via the air vents and the suction holes. As a consequence, the sheet is sucked to the outer peripheral surface of the belt.

In this type of conveying device, there is also a case where the sheet is interposed by a conveying roller pair and is conveyed without using the belt. In this conveying device, the sheet is directly sucked to the top plate part of the fan case via the suction holes. The sheet is conveyed by the conveying roller pair while coming into slide contact with the top plate part.

SUMMARY

A sheet conveying device according to one aspect of the present disclosure includes conveyance parts, a conveyance surface, suction parts, and a foreign substance separating unit. The conveyance parts carry a sheet. The conveyance surface is formed with a suction hole for sucking the sheet. The suction parts are provided on a rear surface of the conveyance surface. The suction parts suck air to apply suction force to the sheet on the conveyance surface via the suction hole. The foreign substance separating unit separates a foreign substance in the air sucked by the suction parts and discharges the air.

The aforementioned foreign substance separating unit has an air introduction chamber, an air discharge chamber, a foreign substance collection chamber, a plurality of first air vents, a plurality of second air vents, centrifugal separation parts, cylindrical parts, and an inclination surface portion. The air introduction chamber receives the air sucked by the suction parts and allows the air to flow in a horizontal direction. The air discharge chamber is provided above the air introduction chamber. The foreign substance collection chamber is provided below the air introduction chamber. The plurality of first air vents are formed in a first partition wall that partitions the air introduction chamber and the foreign substance collection chamber from each other. The plurality of second air vents are formed in a second partition wall that partitions the air introduction chamber and the air discharge chamber from each other. The centrifugal separation parts each includes a reverse truncated cone-like wall portion extending downward from a peripheral edge portion of each of the first air vents and having a diameter gradually smaller downward. The centrifugal separation parts allow air flowing in by each of the first air vents to revolve in a spiral shape so as to separate a foreign substance in the air. The cylindrical parts each are provided coaxially with each of the centrifugal separation parts. A lower end of each of the cylindrical parts is positioned above a lower end of each of the centrifugal separation parts and an upper end of each of the cylindrical parts is connected to each of the second air vents. The cylindrical parts lead an air flow, from which the foreign substance is separated by the centrifugal separation parts, to the air discharge chamber. The inclination surface portion is formed around each of the cylindrical parts above each of the first air vents. The inclination surface portion is inclined downward from one side to a remaining side of a circumferential direction. The inclination surface portion applies a velocity component of the circumferential direction to the air flow flowing into the air introduction chamber in the horizontal direction, and leads the air flow into each of the centrifugal separation parts.

DETAILED DESCRIPTION

Hereinafter, an example of an embodiment will be described in detail on the basis of the drawings. It is noted that the technology of the present disclosure is not limited to the following embodiment.

Embodiment

Figure 1:
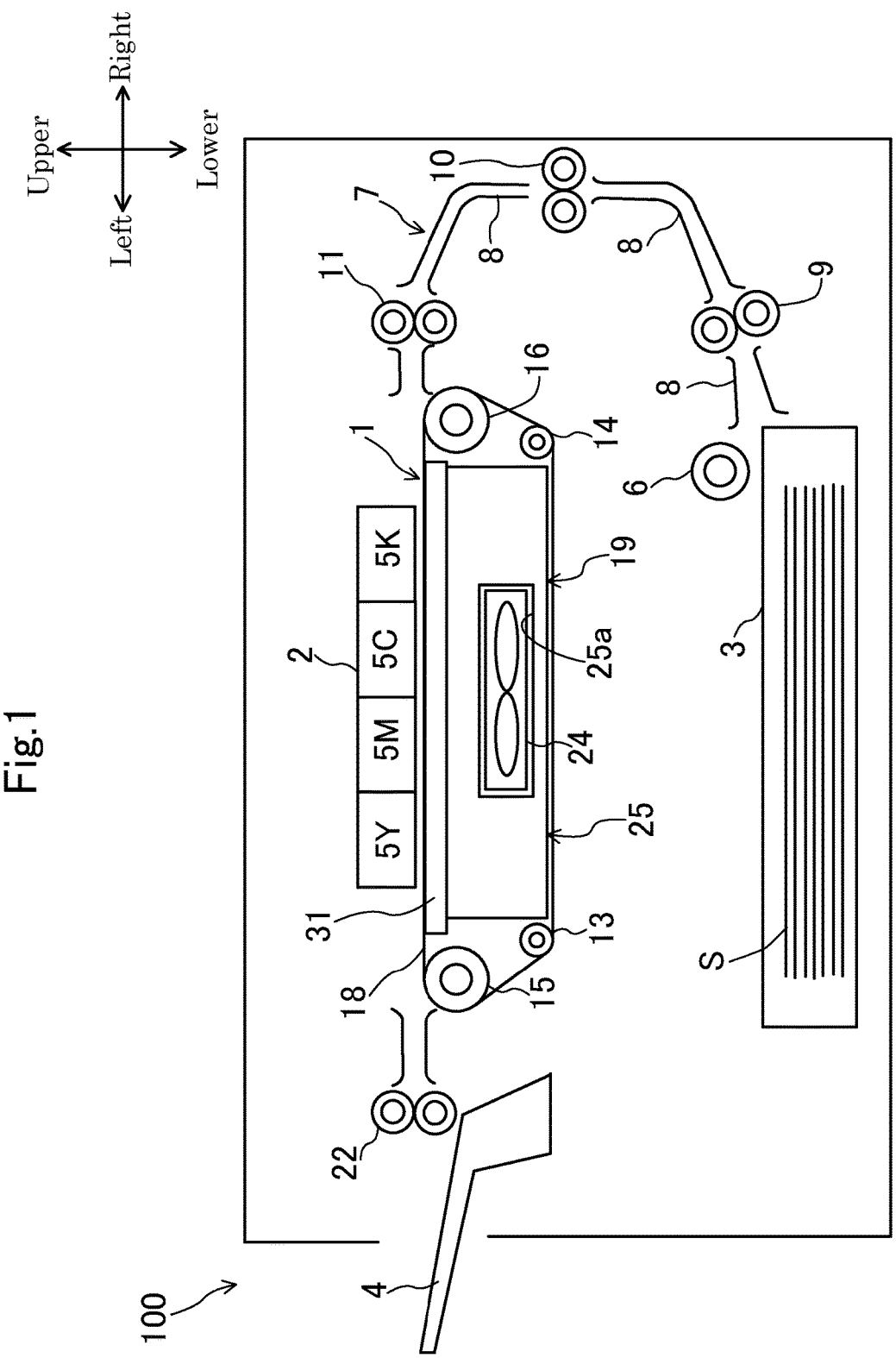
FIG. 1 is a longitudinal sectional view illustrating an image forming apparatus including a sheet conveying device in an embodiment.

FIG. 1 illustrates an image forming apparatus 100 including a sheet conveying device 1 in an embodiment. The image forming apparatus 100 includes an ink head 2, a sheet feeding cassette 3, the aforementioned sheet conveying device 1, and a sheet discharge tray 4, wherein the ink head 2 records an image by discharging ink to a sheet S serving as a recording medium, the sheet feeding cassette 3 receives the sheet S for recording, the sheet conveying device 1 is arranged to face the ink head 2, and the sheet discharge tray 4 discharges the sheet S with the recorded image. In the following description, an "upstream side" and a "downstream side" indicate an upstream side and a downstream side of a sheet conveyance direction, respectively. A "front side" and a "rear side" respectively indicate a front side and a rear side of the image forming apparatus 100, and a "left side" and a "right side" respectively indicate a left side and a right side when the image forming apparatus 100 is viewed from the front side.

The aforementioned ink head 2 is configured to be movable along a guide rail extending in a main scanning direction (a direction vertical to a paper surface of FIG. 1). The ink head 2 has four line heads 5Y, 5M, 5C, and 5K arranged in a sub-scanning direction (a right and left direction of FIG. 1). The line heads 5Y, 5M, 5C, and 5K discharge ink of yellow (Y), magenta (M), cyan (C), and black (K), respectively. The ink head 2 is provided at a lower surface thereof with a plurality of nozzles for each of the line heads 5Y, 5M, 5C, and 5K. Each of the line heads 5Y, 5M, 5C, and 5K changes the volume of a pressure chamber filled with the ink by a piezoelectric element, thereby discharging the ink from the nozzles.

The aforementioned sheet feeding cassette 3 is provided at a lower part of the apparatus and can receive a plurality of sheets S stacked in a sheet shape.

The sheet feeding cassette 3 is provided with a sheet feeding roller 6 for performing sheet feeding. The sheet feeding roller 6 is provided at the downstream side thereof with a conveyance path 7 for leading the sheets S in the sheet feeding cassette 3 to the aforementioned sheet conveying device 1. The conveyance path 7 is configured by a guide plate 8. The conveyance path 7 is provided with a first conveying roller pair 9, a second conveying roller pair 10, and a resist roller pair 11 sequentially toward the downstream side from the upstream side. The sheet S fed from the sheet feeding cassette 3 by the sheet feeding roller 6 is conveyed to the resist roller pair 11 by the first and second conveying roller pairs 9 and 10, and is sent to the sheet conveying device 1 by the resist roller pair 11 at a predetermined timing.

The aforementioned sheet conveying device 1 is arranged below the ink head 2 while facing the ink head 2. The sheet conveying device 1 conveys the sheet S, which is supplied by the resist roller pair 11, to the vicinity of the downstream side from the vicinity of the upstream side of the ink head 2. At the downstream side of the sheet conveying device 1, a sheet discharge roller pair 22 and a sheet discharge tray 4 are provided.

The aforementioned sheet conveying device 1 has a driving roller 15, a driven roller 16, two tension rollers 13 and 14, an annular conveyance belt 18 wound around these four rollers 13 to 16, a negative pressure generating device 19 provided radially inside the conveyance belt 18, and a foreign substance separating device B (not illustrated in FIG. 1) to be described later. The four rollers 13 to 16 and the conveyance belt 18 constitute a conveyance part.

The driving roller 15 is a roller for transmitting driving force to the conveyance belt 18 and is arranged at the downstream side from the ink head 2. The driving roller 15 is connected to a belt driving motor (not illustrated) to be able to transmit power. The belt driving motor is configured by a stepping motor in the present embodiment.

The driven roller 16 is arranged at the upstream side from the ink head 2. The driven roller 16 is arranged at a height approximately the same as that of the driving roller 15. The tension rollers 13 and 14 are rollers for adjusting tension of the conveyance belt 18, and are arranged below the driving roller 15 and the driven roller 16.

An upper surface of the conveyance belt 18 forms a sheet conveyance surface for conveying the sheet S. The upper surface of the conveyance belt 18 extends approximately in parallel with a lower surface of the ink head 2. The conveyance belt 18 conveys the sheet S while sucking and holding the sheet S to/on its own upper surface.

Figure 2:
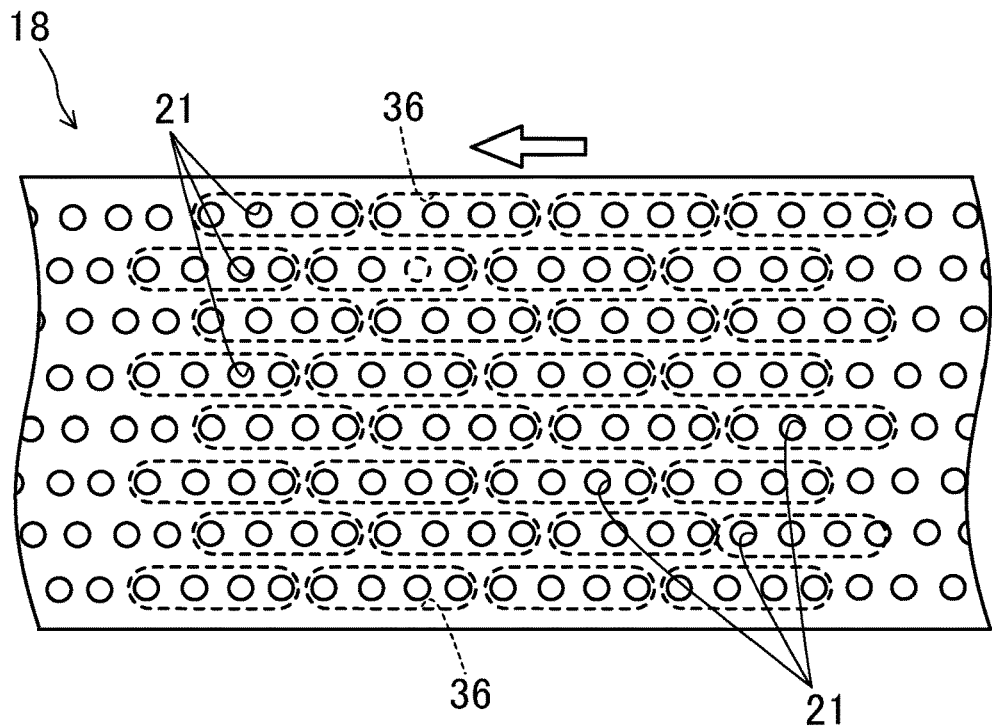
FIG. 2 is a plan view when a conveyance belt of a sheet conveying device is viewed from an upper side.

As illustrated in FIG. 2, the conveyance belt 18 is formed with a plurality of air vents 21. Each air vent 21 is formed penetrating in a thickness direction of the conveyance belt 18. Each air vent 21 has a function of allowing negative pressure generated by the negative pressure generating device 19 to be applied to the sheet S.

The aforementioned negative pressure generating device 19 has a fan case 25 having a fan 24 therein. The fan 24 and the fan case 25 constitute a suction part. An upper wall of the fan case 25 is configured with a metallic top plate part 31. The top plate part 31 abuts an inner peripheral surface of the conveyance belt 18 from below. Furthermore, the top plate part 31 guides and supports the sheet S, which is held on the upper surface (the outer peripheral surface) of the conveyance belt 18, via the conveyance belt 18 from below. The fan case 25 is formed at a rear side wall thereof with an opening 25a. The fan 24 is arranged at a position, which faces the opening 25a, in the fan case 25. To the opening 25a, the foreign substance separating device B (see FIG. 5 to FIG. 12) is connected to separate a foreign substance in the air sucked into the fan case 25 by the fan 24. Details of the foreign substance separating device B will be described later.

Figure 3:
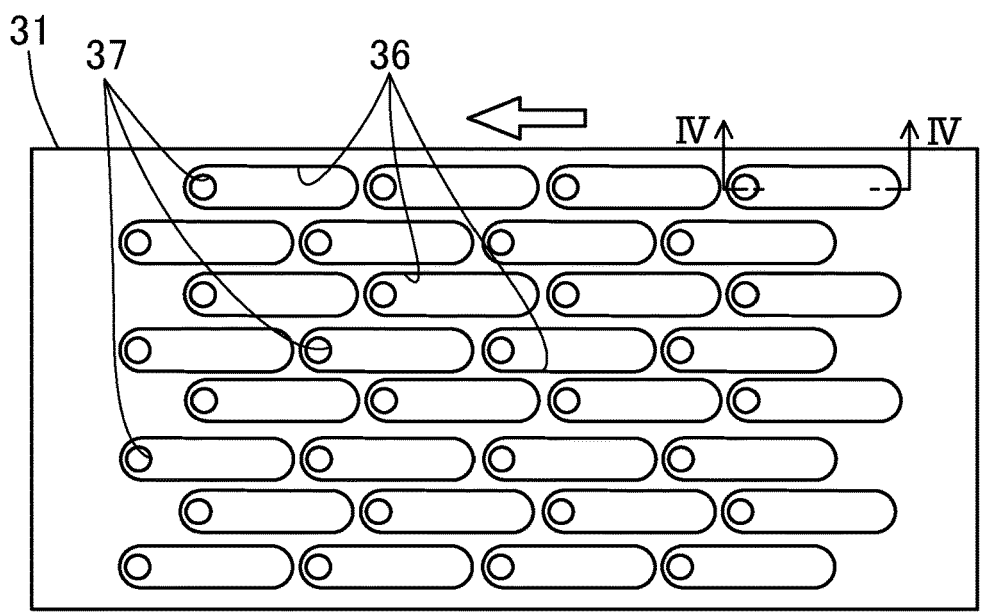
FIG. 3 is a plan view when a top plate part of a fan case is viewed from an upper side.
Figure 4:
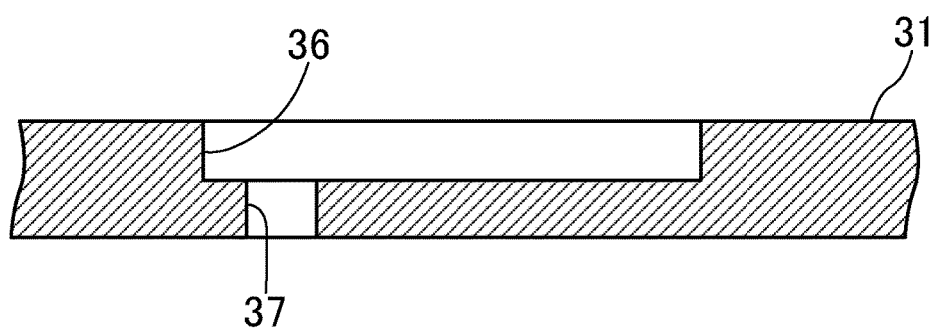
FIG. 4 is a sectional view taken along line IV-IV of FIG. 3.

As illustrated in FIG. 3 and FIG. 4, the aforementioned top plate part 31 is formed on the upper surface thereof with a plurality of slit grooves 36 extending in the sheet conveyance direction. At an end portion of the downstream side of each slit groove 36 in the sheet conveyance direction, a plurality of suction holes 37 are formed penetrating in an up and down direction. When the fan 24 operates, the air is sucked into the fan case 25 and negative pressure is generated, and the negative pressure is applied to the sheet S on the conveyance belt 18 via the suction holes 37 and the air vents 21 of the aforementioned conveyance belt 18. As a consequence, the sheet S is sucked and held to/on the upper surface of the conveyance belt 18.

Configuration of Foreign Substance Separating Device

Figure 5:
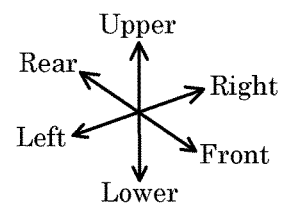
FIG. 5 is a perspective view when a sheet conveying device assembled with a foreign substance separating device is viewed from a front oblique left side.
Figure 5:
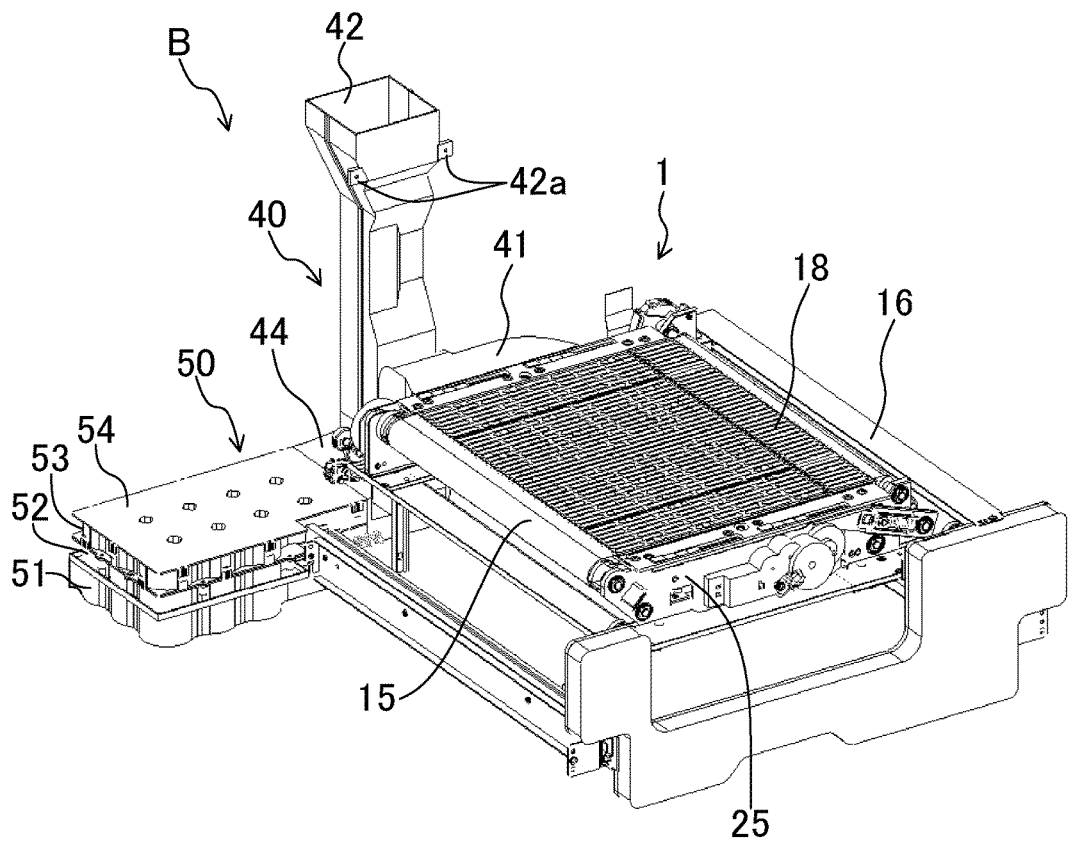
Figure 6:
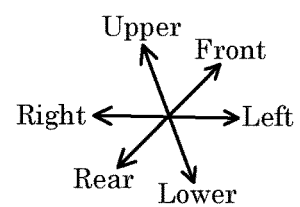
FIG. 6 is a perspective view when a sheet conveying device assembled with a foreign substance separating device is viewed from a rear oblique left side.
Figure 6:
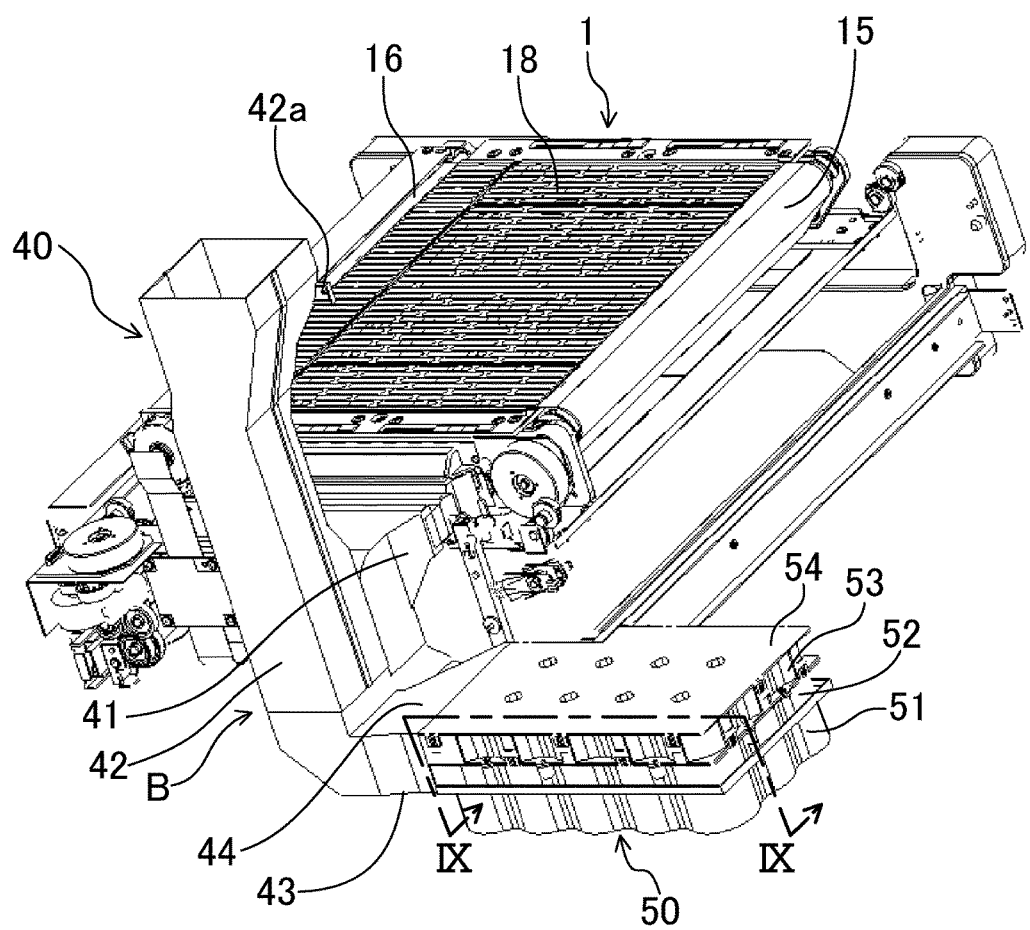
Figure 7:
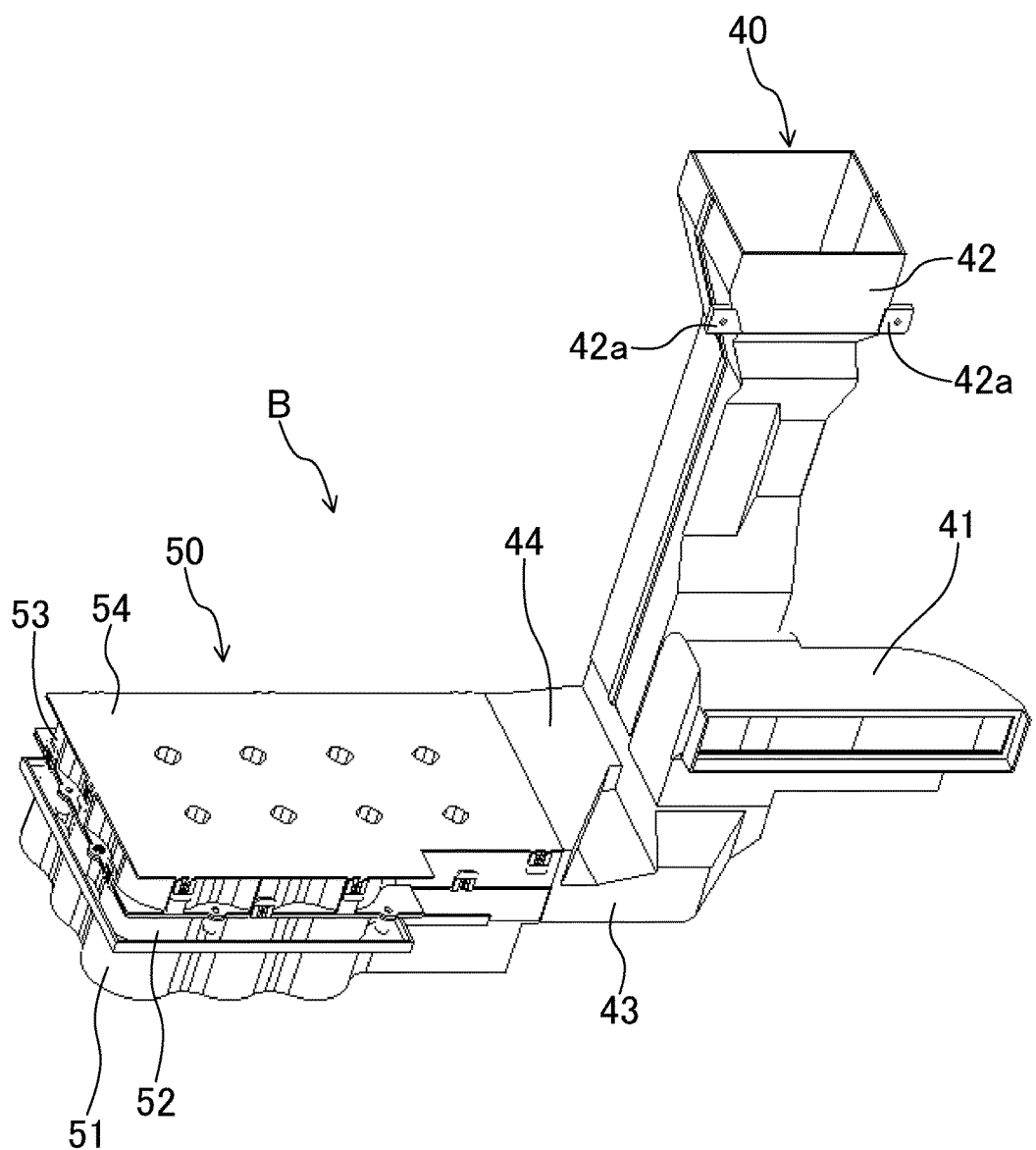
FIG. 7 is a perspective view when a foreign substance separating device is viewed from a front oblique upper side.

As illustrated in FIG. 5 to FIG. 7, the foreign substance separating device B has a duct unit 40 for performing an air guide discharge function and a separating unit (a foreign substance separating unit) 50 for performing a function of separating a foreign substance in the air. The duct unit 40 and the separating unit 50 are connected to each other via a fastening member such as a bolt.

Figure 8:
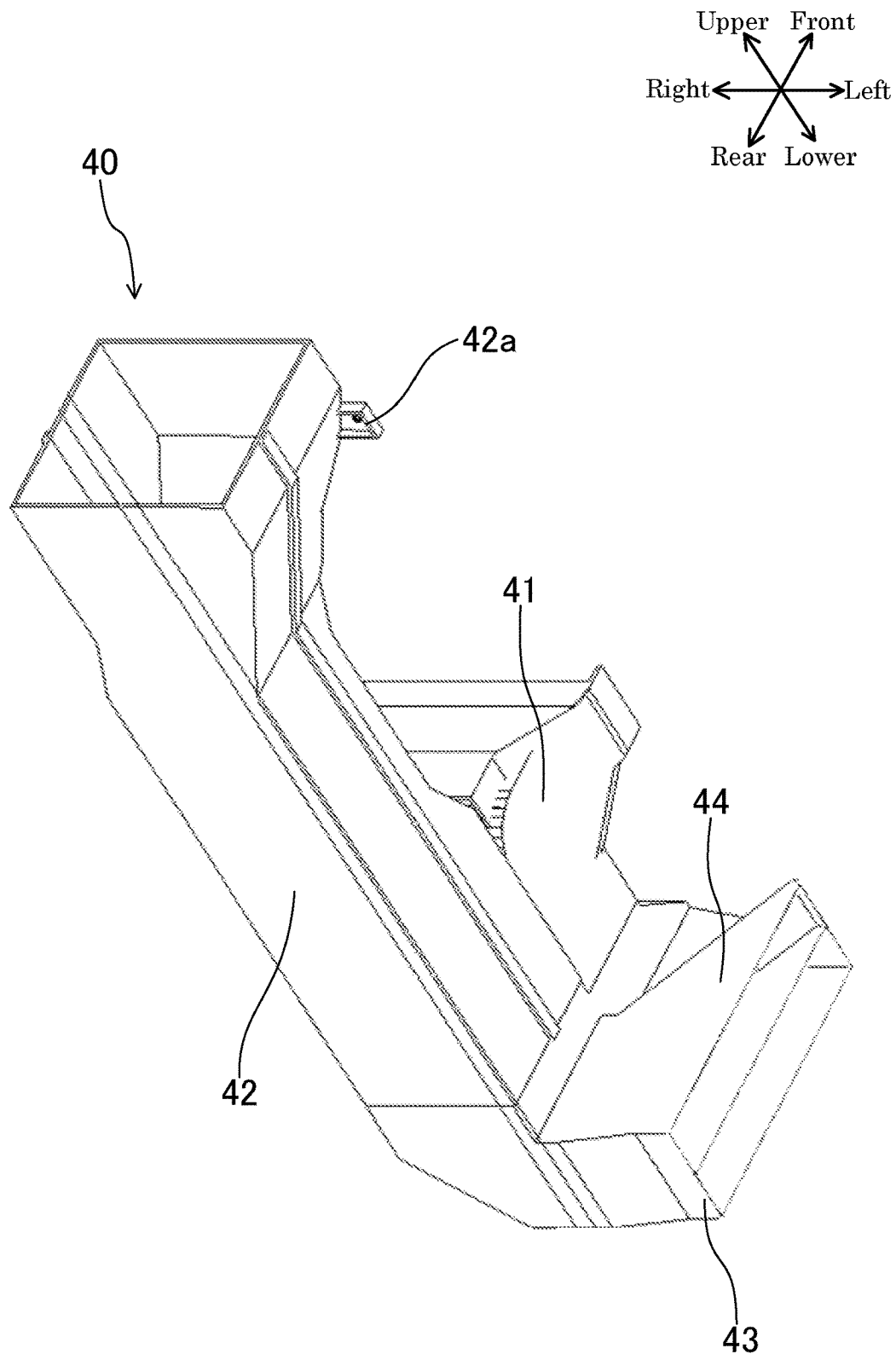
FIG. 8 is a perspective view when a duct unit (a remaining unit obtained by removing a foreign substance separating unit from a foreign substance separating device) of the foreign substance separating device is viewed from a rear oblique left side.

As illustrated in FIG. 8, the duct unit 40 has an introduction duct part 41 and a discharge duct part 42, which have a rectangular section and extend in the up and down direction, and a first connection duct part 43 and a second connection duct part 44 which have a rectangular section and are vertically connected to a lower end portion of the introduction duct part 41.

An upper end portion of the introduction duct part 41 is curved to the front side and is connected to the opening 25*a* of the fan case 25. The lower end portion of the introduction duct part 41 is connected to the separating unit 50 via the first connection duct part 43. The first connection duct part 43 has a rectangular shape extending in the right and left direction in the plan view. A sectional area of an air passage in the first connection duct part 43 is constant in the right and left direction (an air flow direction). The air passage in the first connection duct part 43 communicates with an air introduction chamber 55 (see FIG. 9) in the separating unit 50.

An upper end of the discharge duct part 42 is opened upward and is connected to an air discharge port (not illustrated) formed on the upper surface of the image forming apparatus 100. A lower end portion of the discharge duct part 42 is connected to the separating unit 50 via the second connection duct part 44. The second connection duct part 44 has a trapezoidal shape in which its width is widened leftward from the right side in the plan view. A sectional area of an air passage in the discharge duct part 42 is gradually reduced to the left side from the right side (to the downstream side from the upstream side). An air passage in the second connection duct part 44 communicates with an air discharge chamber 56 (see FIG. 9) in the separating unit 50. A reference numeral 42*a* of FIG. 7 is a bracket part for fixing the upper end portion of the discharge duct part 42 to a fixed frame of the image forming apparatus 100.

Figure 9:
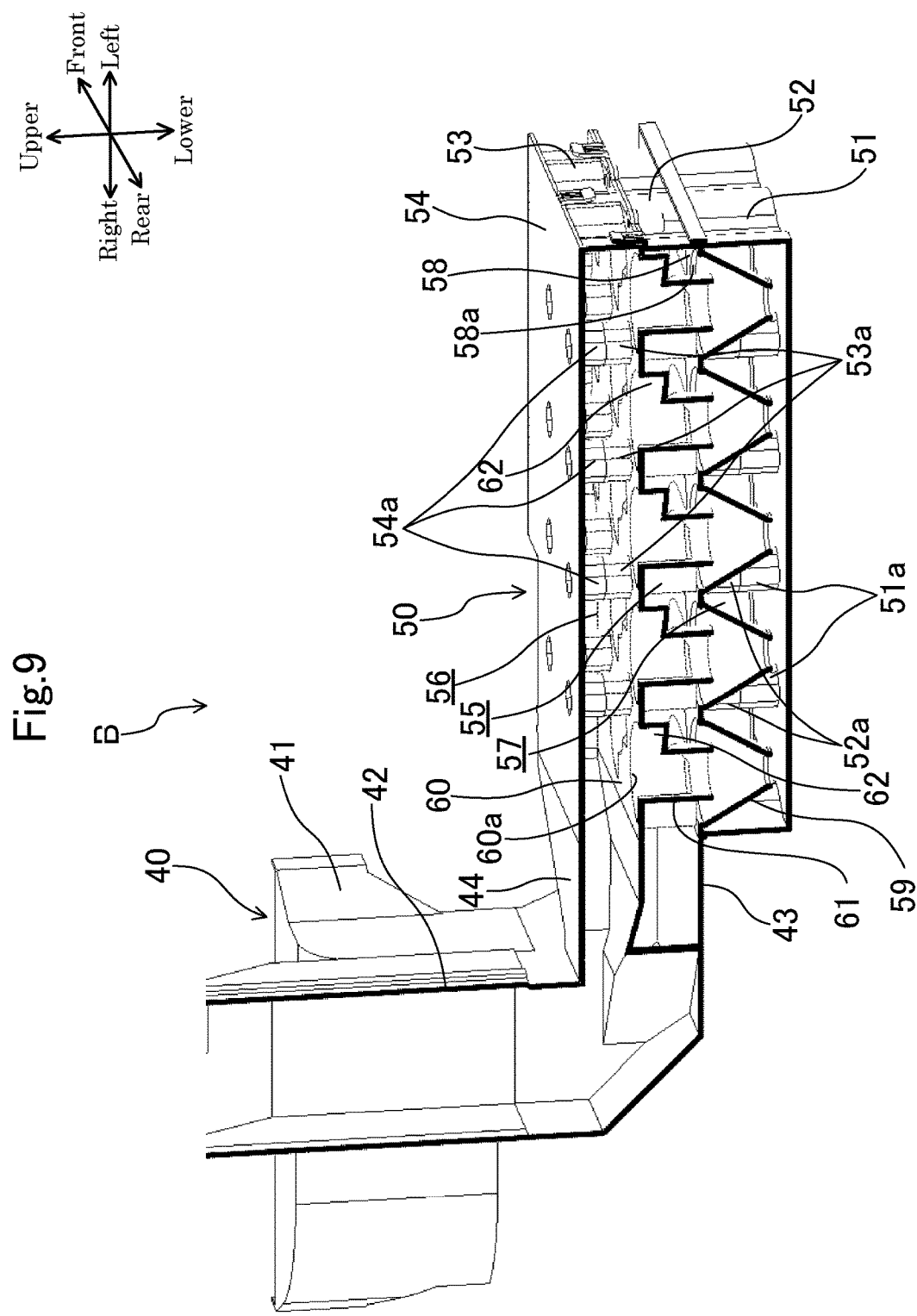
FIG. 9 is a sectional view taken along line IX-IX of FIG. 6.
Figure 10:
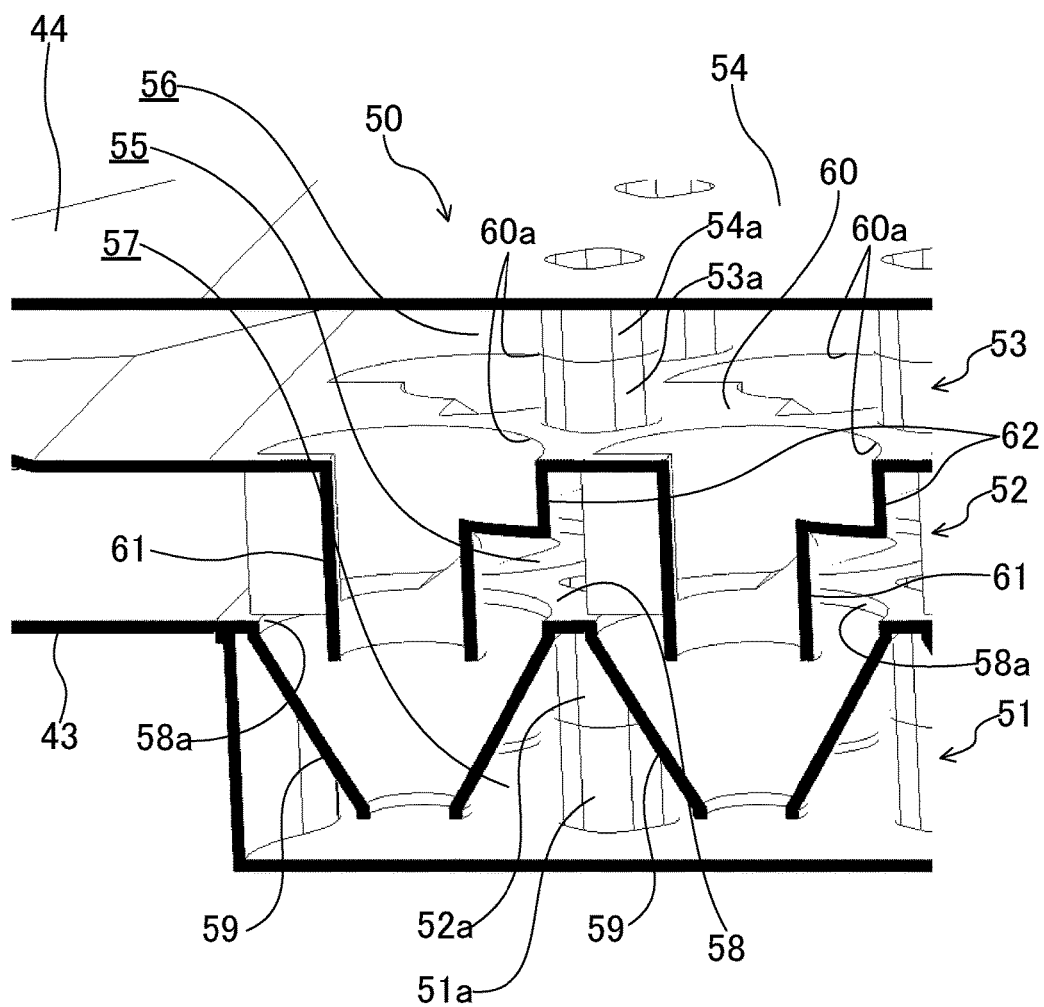
FIG. 10 is an enlarged view illustrating each centrifugal separation part and a periphery thereof in FIG. 9.
Figure 11:
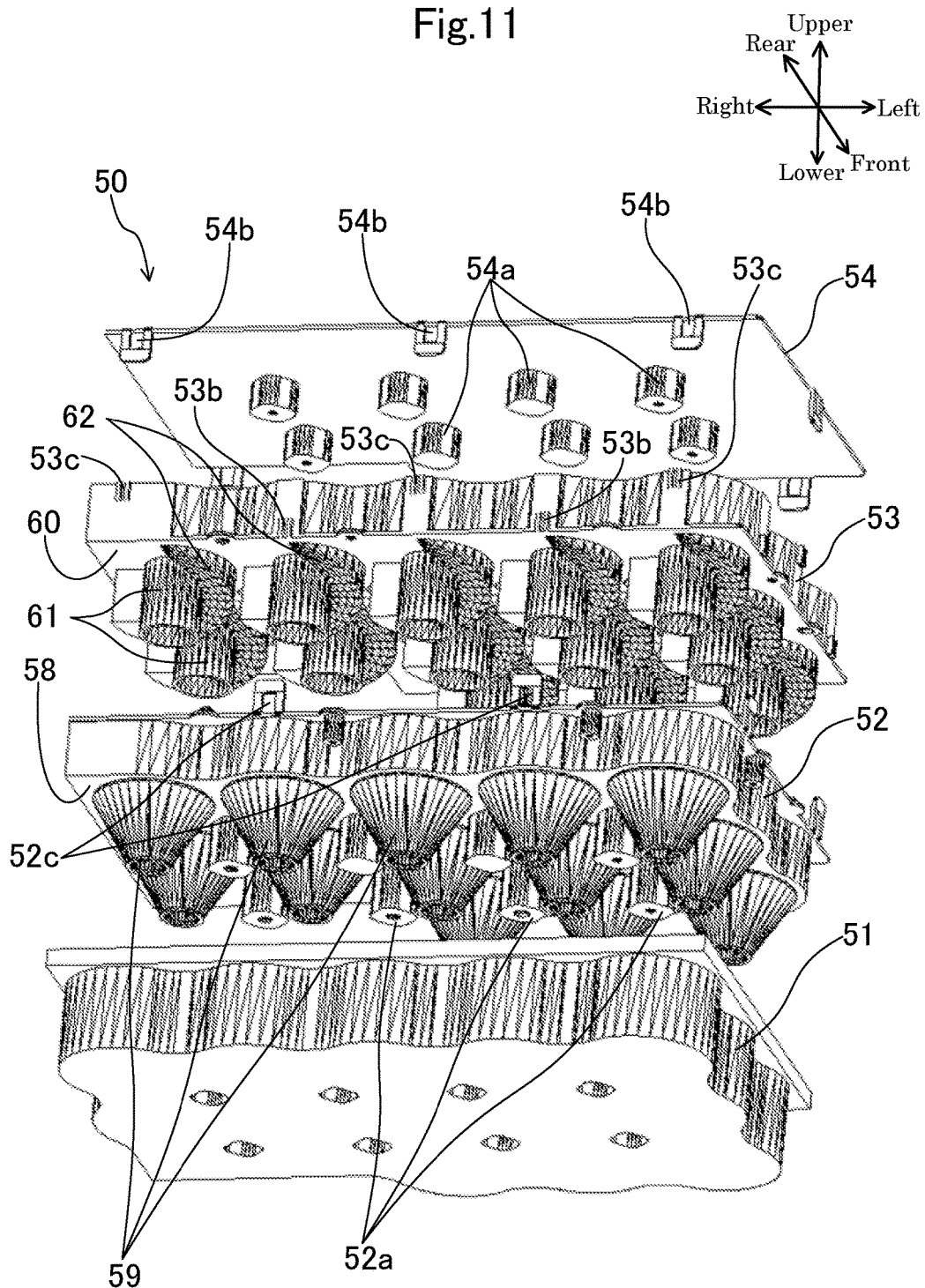
FIG. 11 is an exploded perspective view illustrating a separating unit of a foreign substance separating device.

The separating unit 50 has a flat rectangular parallelepiped shape long in the right and left direction in appearance. As illustrated in FIG. 9 to FIG. 11, the separating unit 50 is formed by sequentially stacking a body case part 51 serving as a case body (51), a first separating member 52, a second separating member 53, and a lid member 54 from bottom to top.

The body case part 51 and the first separating member 52 are connected and fixed to each other by fastening protruding boss parts 51*a* and protruding boss parts 52*a* to each other with bolts, wherein the protruding boss parts 51*a* and the protruding boss parts 52*a* are respectively formed in the body case part 51 and the first separating member 52. The first separating member 52 and the second separating member 53 are connected and fixed to each other by allowing engaging holes 52*c* of a mounting piece provided at a peripheral side part of the first separating member 52 to be engaged with hook parts 53*b* protruding to a peripheral side part of the second separating member 53. The lid member 54 and the second separating member 53 are connected and fixed to each other by fastening protruding boss parts 54*a* and protruding boss parts 53*a* to each other with bolts, wherein the protruding boss parts 54*a* and the protruding boss parts 53*a* are respectively formed in the lid member 54 and the second separating member 53. Furthermore, the lid member 54 is connected and fixed to the second separating member 53 by allowing engaging holes 54*b* of a mounting piece provided at a peripheral edge portion of the lid member 54 to be engaged with hook parts 53*c* protruding to the peripheral side part of the second separating member 53.

As illustrated in FIG. 9 and FIG. 10, a space in the separating unit 50 is partitioned into three of the air introduction chamber 55, the air discharge chamber 56, and a foreign substance collection chamber 57. The air discharge chamber 56 and the foreign substance collection chamber 57 are respectively arranged above and below the air introduction chamber 55 while interposing the air introduction chamber 55 therebetween.

A first partition wall 58, which partitions the air introduction chamber 55 and the foreign substance collection chamber 57 from each other, is formed with a plurality of (for example, 13 in the present embodiment) first air vents 58*a*. The 13 first air vents 58*a* are arranged in three rows of a front side row, a center row, and a rear side row, wherein the front side row and the center row are respectively configured by five first air vents 58*a* and the rear side row is configured by three first air vents 58*a*. In each row, the first air vents 58*a* are arranged at regular intervals in the right and left direction.

To the peripheral edge portion of each first air vent 58*a* formed at the first partition wall 58, a centrifugal separation part 59 having a reverse truncated cone-like wall portion is connected, wherein a diameter of the centrifugal separation part 59 is gradually smaller downward.

A second partition wall 60, which partitions the air introduction chamber 55 and the air discharge chamber 56 from each other, is formed with a plurality of (for example, 13 in the present embodiment) second air vents 60*a*. The plurality of second air vents 60*a* are respectively formed coaxially with the aforementioned plurality of first air vents 58*a*. A hole diameter of each second air vent 60*a* is equal to that of each first air vent 58*a*.

Figure 12:
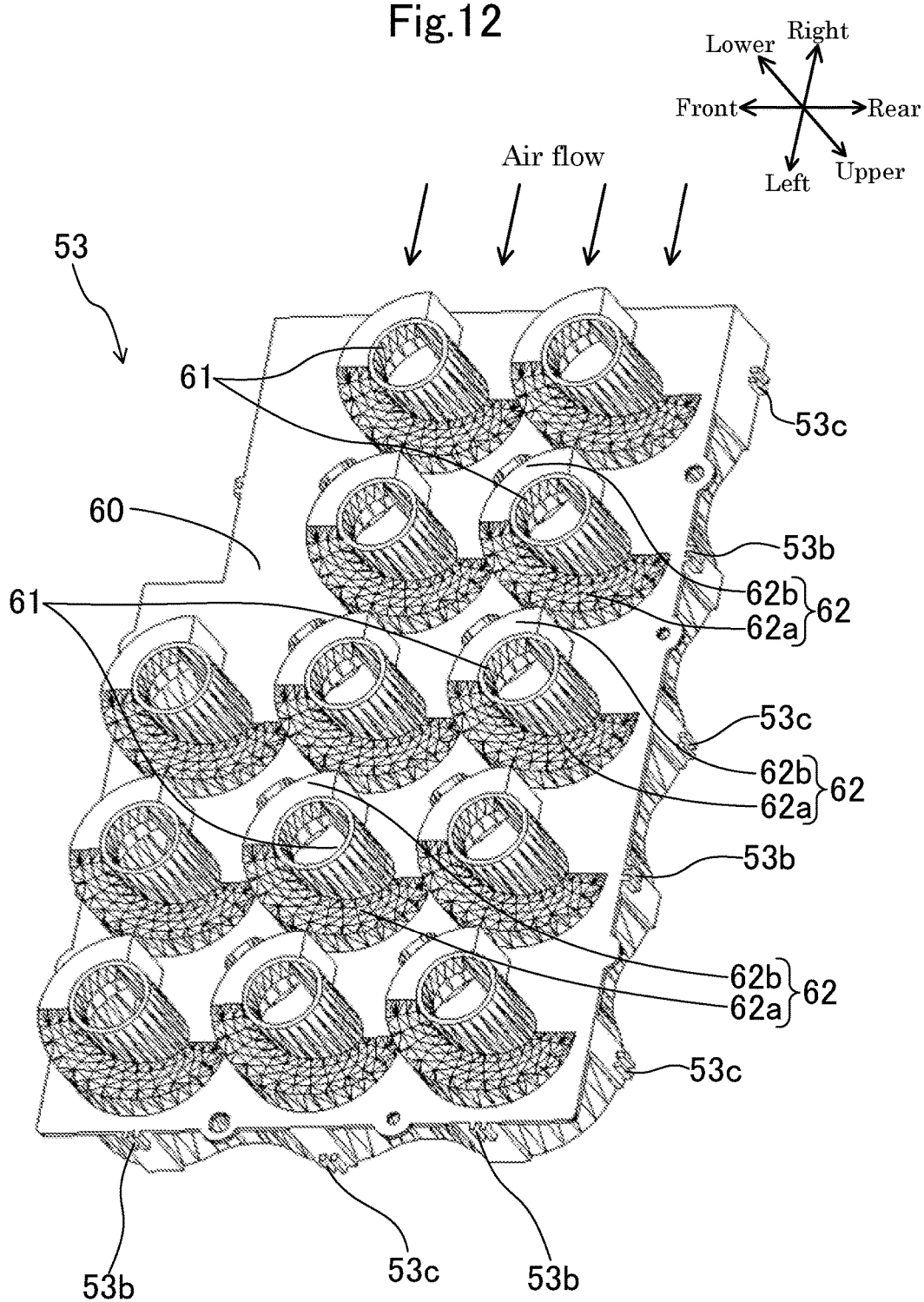
FIG. 12 is a perspective view when a first separating member (an element of a separating unit) is viewed from a lower side (a rear surface side).

As illustrated in FIG. 12, from a lower surface side of the second partition wall 60, a plurality of cylindrical parts 61 and air guide parts 62 protrude, wherein each air guide part 62 extends along an outer peripheral surface of each cylindrical part 61.

The cylindrical part 61 is formed coaxially formed with each second air vent 60*a*. An outer diameter of the cylindrical part 61 is smaller than a hole diameter of the second air vent 60*a*.

The air guide part 62 connects the outer peripheral surface of each cylindrical part 61 and a peripheral edge portion of each second air vent 60*a* to each other. An outer diameter of the air guide part 62 is slightly larger than the hole diameter of the second air vent 60*a*.

The air guide part 62 is formed to surround a range of ¾ (270° when viewed at an angle of a circumferential direction) of the outer peripheral surface of each cylindrical part 61 when viewed from an axial direction.

A lower end surface of the air guide part 62 is configured with an inclination surface portion 62*a* and a flat surface portion 62*b*.

The inclination surface portion 62*a* is formed to surround a half (a range of 180° when viewed at the angle of the circumferential direction) of an opposite side of an air intake side in the outer peripheral surface of each cylindrical part 61 when viewed from the axial direction. The inclination surface portion 62*a* is formed such that a distance from the second partition wall 60 increases (in other words, formed to be approximate to the first air vents 58*a*) from one side to the other side of the circumferential direction.

The flat surface portion 62*b* is continuously connected to the other end portion of the inclination surface portion 62*a* in the circumferential direction. The flat surface portion 62*b* is formed to surround a range of ¼ (90° when viewed at the angle of the circumferential direction) of the outer peripheral surface of each cylindrical part 61 when viewed from the axial direction. The flat surface portion 62*b* is positioned above an upper end position of the first air vent 58*a* (see FIG. 10) by a predetermined distance. Preferably, the predetermined distance is equal to or more than 0 mm and is equal to or less than 1 mm. The flat surface portion 62*b* may be positioned at the same height as that of the upper end position of the first air vent 58*a*.

In the sheet conveying device 1 configured as above, air sucked into the fan case 25 through an operation of the fan 24 is led to the air introduction chamber 55 (see FIG. 10) of the separating unit 50 through the introduction duct part 41 and the first connection duct part 43. Then, the air flow lead into the air introduction chamber 55 reaches a periphery of each cylindrical part 61, falls down while revolving along the inclination surface portion 62*a* of the air guide part 62, reaches the flat surface portion 62*b*, and then flows into an inner wall surface of the centrifugal separation part 59. Then, the supplied air flow falls down while revolving along the inner surface of the centrifugal separation part 59. In this case, a foreign substance included in the air is separated by centrifugal force and drops into the foreign substance collection chamber 57 from a lower end opening of the centrifugal separation part 59. On the other hand, the air flow reaching the lower end of the centrifugal separation part 59 is drawn to a low pressure area of a center part side and moves up, and then is led into the air discharge chamber 56 through the cylindrical part 61. By so doing, the air flow led into the air discharge chamber 56 is discharged outside the apparatus through the second connection duct part 44 and the discharge duct part 42.

Consequently, in the present embodiment, a foreign substance (for example, paper powder, ink and the like) in air sucked into the fan case 25 by the fan 24 is separated by the separating unit 50, and only clean air including no foreign substance is discharged outside the apparatus through the discharge duct part 42. Thus, it is possible to prevent the foreign substance from being discharged outside the apparatus together with an air flow and from contaminating a peripheral environment.

Since the separating unit 50 is configured to perform centrifugal separation by allowing a foreign substance of air to revolve by each centrifugal separation part 59, pressure loss of the air is reduced as compared with the case using a filter and the like, so that it is possible to improve operation efficiency of the fan 24. Furthermore, since it is not necessary to regularly exchange the filter, it is possible to reduce cost required for maintenance of the sheet conveying device 1.

Furthermore, the separating unit 50 is configured to be detachable from the duct unit 40 (a part of the sheet conveying device 1). Consequently, it is possible to easily perform work for removing a foreign substance stored in the foreign substance collection chamber 57 of the separating unit 50.

Furthermore, the foreign substance collection chamber 57 is a space partitioned by the body case part 51 and the first separating member 52 covering the upper side of the body case part 51, and the body case part 51 is bolt-fastened to the first separating member 52 and is detachable from the first separating member 52.

Consequently, only by detaching the body case part 51, it is possible to easily remove a foreign substance stored in the foreign substance collection chamber 57 (the body case part 51).

Furthermore, the inclination surface portion 62*a* of the aforementioned air guide part 62 falls down from one side to the other side of the cylindrical part 61 in the circumferential direction, and the flat surface portion 62*b* having a constant height in the circumferential direction is connected to the other side end of the inclination surface portion 62*a*. The flat surface portion 62*b* is formed at a position equal to the upper end position of the first air vent 58*a* or is formed above the upper end position by a predetermined distance (larger than 0 mm and equal to or less than 1 mm).

As described above, a part of the first air vent 58*a* is approximately blocked by the flat surface portion 62*b*, so that an air flow lead from one side to the other side of the inclination surface portion 62*a* in the circumferential direction is reliably flown into the first air vent 58*a* and thus can be lead to the centrifugal separation part 59.

Furthermore, the aforementioned centrifugal separation part 59 is provided in a plural number and is arranged in a column shape in the plan view. In this way, it is possible to achieve compactification of the entire separating unit 50 by suppressing a height as compared with the case where one centrifugal separation part 59 is provided.

Other Embodiments

The aforementioned embodiment describes an example in which the sheet conveying device 1 is applied to an inkjet type image forming apparatus; however, the technology of the present disclosure is not limited thereto and the sheet conveying device 1 may be applied to all apparatuses that convey a sheet.

Furthermore, a print scheme of an image forming apparatus is not limited to the inkjet type, and for example, it may be an electrophotographic scheme.

Furthermore, in the aforementioned present embodiment, the sheet conveying device 1 is configured to suck and hold a sheet to/on the upper surface of the conveyance belt 18; however, the sheet may be interposed by the conveying roller pair and be conveyed without using the conveyance belt. In this case, the sheet conveying device 1 is directly sucked to the top plate part 31 of the fan case 25 via the suction holes 37, so that the sheet is conveyed by the conveying roller pair while coming into slide contact with the top plate part.

What is claimed is:

1. A sheet conveying device comprising:
   conveyance parts that carry a sheet;
   suction parts that are provided on a conveyance surface formed with a suction hole for sucking the sheet and a rear surface of the conveyance surface, and suck air to apply suction force to the sheet on the conveyance surface via the suction hole; and
   a foreign substance separating unit that separates a foreign substance in the air sucked by the suction parts and discharges the air,
   wherein the foreign substance separating unit comprises:
   an air introduction chamber that receives the air sucked by the suction parts and allows the air to flow in a horizontal direction;
   an air discharge chamber provided above the air introduction chamber;
   a foreign substance collection chamber provided below the air introduction chamber;

a plurality of first air vents formed in a first partition wall that partitions the air introduction chamber and the foreign substance collection chamber from each other;

a plurality of second air vents formed in a second partition wall that partitions the air introduction chamber and the air discharge chamber from each other;

centrifugal separation parts each including a reverse truncated cone-like wall portion extending downward from a peripheral edge portion of each of the first air vents and having a diameter gradually smaller downward, and allowing air flowing in by each of the first air vents to revolve in a spiral shape so as to separate a foreign substance in the air;

cylindrical parts that each are provided coaxially with each of the centrifugal separation parts and lead an air flow, from which the foreign substance is separated by the centrifugal separation parts, to the air discharge chamber, a lower end of each of the cylindrical parts being positioned above a lower end of each of the centrifugal separation parts and an upper end of each of the cylindrical parts being connected to each of the second air vents; and an inclination surface portion that is formed around each of the cylindrical parts above each of the first air vents, is inclined downward from one side to a remaining side of a circumferential direction, applies a velocity component of the circumferential direction to the air flow flowing into the air introduction chamber in the horizontal direction, and leads the air flow into each of the centrifugal separation parts.

2. The sheet conveying device of claim 1, wherein the foreign substance separating unit is configured to be unitized and be detachable from the sheet conveying device.

3. The sheet conveying device of claim 1, wherein the foreign substance collection chamber is a space partitioned by the body case part opened upward and the first separating member covering an upper side of the body case part, and the body case part is configured to be detachable from the first separating member.

4. The sheet conveying device of claim 1, further comprising:

a flat surface portion connected to a remaining end of the inclination surface portion in the circumferential direction and having a constant height in the circumferential direction, wherein the flat surface portion is positioned at a height equal to an upper end position of each of the first air vents or is positioned above the upper end position by a predetermined distance, and the predetermined distance is larger than 0 mm and equal to or less than 1 mm.

5. An image forming apparatus comprising the sheet conveying device of claim 1.

* * * * *